United States Patent [19]

Yada

[11] Patent Number: 5,376,718
[45] Date of Patent: Dec. 27, 1994

[54] FLAME RETARDANT RESIN COMPOSITION

[75] Inventor: Mitsuyuki Yada, Suzuka, Japan

[73] Assignee: Monsanto Kasei Company, Tokyo, Japan

[21] Appl. No.: 125,159

[22] Filed: Sep. 23, 1993

[30] Foreign Application Priority Data

Sep. 25, 1992 [JP] Japan .................................. 4-256364

[51] Int. Cl.$^5$ .................. C08G 65/32; G08L 71/02
[52] U.S. Cl. ..................... 524/409; 525/227; 525/241; 525/396; 525/403; 525/132; 525/523; 525/527
[58] Field of Search .................. 524/409, 411, 469; 525/227, 233, 85, 241, 396, 403, 523, 527, 132

[56] References Cited

U.S. PATENT DOCUMENTS 4,221,893  9/1980  Behar et al. .................. 525/438
5,208,288  5/1993  Mishima et al. ............... 525/84

FOREIGN PATENT DOCUMENTS 62-4737  1/1987  Japan .

*Primary Examiner*—James J. Seidleck
*Assistant Examiner*—Mary Critharis
*Attorney, Agent, or Firm*—Nixon & Vanderhye

[57] ABSTRACT

Disclosed herein is a flame-retardant resin composition comprising 100 parts by weight of a styrene based polymer, 10 to 40 parts by weight of a brominated bisphenol epoxy resin or a resin in which at least one of the epoxy terminals of the brominated bisphenol epoxy resin is blocked with a brominated phenol, 1 to 10 parts by weight of antimony trioxide, and 0.3 to 5 parts by weight of a methacrylate polymer with a methacrylate unit content of not less than 25 wt %.

18 Claims, No Drawings

FLAME RETARDANT RESIN COMPOSITION

BACKGROUND OF THE INVENTION

The present invention relates to a flame-retardant resin composition. Particularly, it relates to a flame-retardant resin composition which, in a molten state, scarcely deposits on metals, and is short in retainment time during working and molding operations, free from a qualitative defect such as yellowing and the like and improved in workability and moldability.

The flame-retardant compositions comprising a styrene based resin, a brominated bisphenol A epoxy resin and antimony trioxide are popularly used for interior and exterior parts of electric parts, business machines, etc., owing to their excellent light resistance.

Such a flame-retardant resin composition is proposed in JP-A-62-4737 (1987). More specifically, there is disclosed in the JP-A-62-4737 (1987) a flame-retardant resin composition comprising 100 parts by weight of a styrene based resin, 3 to 40 parts by weight of a flame-retardant obtained by heating a halogenated bisphenol A epoxy resin and a halogenated phenol such as tribromophenol, dibromocresol, trichlorophenol and dichlorocresol in the presence of a basic catalyst, and 2 to 10 parts by weight of antimony trioxide.

The expansion of the range of use of the flame-retardant resin compositions comprising a styrene based resin, a brominated bisphenol A epoxy resin and antimony trioxide has brought about various collateral problems. For instance, due to the characteristics of the epoxy group in the brominated bisphenol A epoxy resin as an essential component of the flame-retardant resin composition, this composition tends to adhere to the metal portions of an extruder, molding machine, etc., giving rise to the problem that the composition be retained in the extruder, molding machine, etc., during working and molding operations.

Specifically, the flame-retardant resin compositions containing a brominated bisphenol A epoxy resin in large quantities have many problems of sticking to screw(s) in the extruder or molding machine due to their high metal adhesive property in a molten state, thereby rising an inconstant discharge in the case of extruder, an inconstant measuring time in the case of molding machine, or an improper stripping of sheet in the case of heated rolls. Also, since the retainment (detention) time of the resin composition in the molding cylinder, hot-runner mold, etc., is elongated, there may take place decoloration (burning) or yellowing on the molded product.

In order to solve these problems, it is attempted in the art to add various kinds of wax, metallic soap, silicone oil or the like, but it needs to add a large quantities (such as 0.3 to 5 wt %) of the said substance for solving the above problems. Addition of a wax or metallic soap in large quantities, however, results in a marked reduction of flame retardant property, thermal stability and heat resistance, and an increased plate-out in the mold. Also, addition of silicone oil in large quantities aggrandizes wear of metal and makes the molding cylinder and screw susceptible to damage.

As a result of the present inventors' earnest studies for solving the above-mentioned defects, it has been found that by adding a specific methacrylate polymer at the specific amount to a composition of styrene based polymer containing a brominated bisphenol epoxy resin as a flame retardant and antimony trioxide, the thus obtained resin composition is low in adhesiveness to metals in a melten state and excellent in workability and moldability, while maintaining high flame retardant property, thermal stability and heat resistance with suppressed plate-out. The present invention has been attained on the basis of this finding.

SUMMARY OF THE INVENTION

It is an object of the present invention to provide a flame-retardant resin composition which shows an excellent flame-retardant property, a high heat resistance, an excellent thermal stability, a high light resistance and an excellent plate-out resistance, and is low in adhesiveness to metals in a molten state and also excellent in workability and moldability.

In a first aspect of the present invention, there is provided a flame-retardant resin composition comprising 100 parts by weight of a styrene based polymer, 10 to 40 parts by weight of a brominated bisphenol epoxy resin or a resin in which at least one of the epoxy terminals of the brominated bisphenol epoxy resin is blocked with a brominated phenol, 1 to 10 parts by weight of antimony trioxide, and 0.3 to 5 parts by weight of a methacrylate polymer with a methacrylate unit content of not less than 25 wt %.

In a second aspect of the present invention, there is provided a flame-retardant resin composition comprising 100 parts by weight of a styrene based polymer, 10 to 40 parts by weight of a brominated hisphenol epoxy resin or a resin in which at least one of the epoxy terminals of the brominated bisphenol epoxy resin is blocked with a brominated phenol, 1 to 10 parts by weight of antimony trioxide, 0.3 to 5 parts by weight of a methacrylate polymer with a methacrylate unit content of not less than 25 wt %, and not more than 5 parts by weight, preferably 0.1 to 5 part by weight of a chlorinated polyethylene.

DETAILED DESCRIPTION OF THE INVENTION

The styrene based polymers as a component (A) in the present invention include homopolymers or copolymers of styrene or styrene derivatives such as α-methylstyrene and vinyltoluene, copolymers of these monomers and cyano-substituted vinyl monomers such as acrylonitrile and methacrylonitrile, and graft copolymers obtained by polymerizing styrene or a styrene derivative and the said vinyl monomers in the presence of a rubber polymer. The styrene content in the styrene based polymer used in the present invention is preferably at least 50 wt %, more preferably not less than 55 wt %.

The term "styrene" used in the present specification refers to non-substituted styrene and aromatic ring- and/or side chain-substituted styrene. Examples of substituent of substituted styrene are lower alkyl ($C_1$–$C_4$), lower alkoxy ($C_1$–$C_4$) and halogen atom.

Examples of the rubber polymers usable in the above graft-polymerization are polybutadiene, butadiene-styrene copolymer, butadiene-acrylonitrile copolymer, ethylene-propylene copolymer, polychloroprene, acrylic rubber and the like.

As means for modification with a rubber polymer, there is principally employed a method in which a vinyl monomer is graft-polymerized in the presence of a rubber polymer by emulsion polymerization, emulsion-suspension polymerization, bulk polymerization or other suitable polymerization method. A rubber polymer and/or a styrene based polymer, or other thermoplastic resin may be blended in the obtained graft polymer for providing the prescribed rubber polymer concentration. The content of the rubber polymer in the rubber modified styrene based polymer is preferably in the range of 5 to 50 wt %, more preferably 7 to 25 wt %.

Preferred examples of the styrene based polymers usable in the present invention are styrene based polymers provided with impact resistance by a rubber polymer, i.e. ABS resin, AES resin, AAS resin, HIPS resin and the like.

The styrene based polymer used in the present invention may be blended with a thermoplastic resin miscible therewith, such as polyvinyl chloride and polycarbonate, provided that the styrene content after such blending is still not less than 50 wt %, preferably not less than 60 wt %.

As for the brominated bisphenol epoxy resin or a resin in which at least one of the epoxy terminals of the brominated bisphenol epoxy resin is blocked with a brominated phenol as a component (B) in the present invention, those commercially available as flame-retardant resin can be used.

The brominated bisphenol epoxy resin is usually an epoxy-terminated resin obtained by a condensation reaction of a brominated bisphenol and epihalohydrin. A typical example of such resin is brominated bisphenol A epoxy resin represented by the following formula (1):

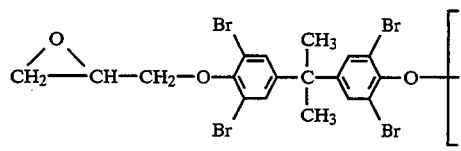 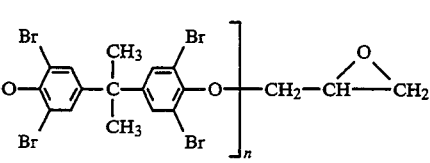

(1)

wherein n denotes polymerization degree.

The polymerization degree of the component (B) is usually in the range of 2 to 100, preferably 2 to 10, more preferably 2 to 5, in view of compatibility with the styrene based polymer and workability of the resin composition. The epoxy equivalent of the component (B) is usually 300 to 70,000 g/eq, and the bromine content is usually 30 to 60 wt %, preferably 50 to 60 wt %.

The epoxy equivalent is associated with the molecular weight or polymerization degree of the epoxy resin, and it may be properly selected from within the above-defined range according to the purpose of use of the flame-retardant resin composition of the present invention. For example, in case where a high heat resistance is required, the epoxy equivalent is preferably 20,000 to 60,000 g/eq, and in case where a good fluidity and a high impact resistance are required, the epoxy equivalent is preferably 300 to 2,500 g/eq.

The "brominated bisphenol epoxy resin in which at least one of the epoxy terminals thereof is blocked with a brominated phenol" used in the present invention is a brominated bisphenol epoxy resin in which one end or both ends of the molecule thereof have been subjected to an addition/ring-opening reaction with a brominated phenol such as 2,4,6-tribromophenol. Especially the one in which a brominated phenol is incorporated to both molecular ends of the brominated bisphenol epoxy resin is preferred.

The content of the component (B) in the flame-retardant resin composition according to the present invention is usually 10 to 40 parts by weight, preferably 15 to 35 parts by weight based on 100 parts by weight of the styrene based polymer. When the content of the component (B) is less than 10 parts by weight based on 100 parts by weight of the styrene based polymer, the resin composition is deteriorated in flame-retardant property and can not meet the prescribed flame-retardant standards. When the content exceeds 40 parts by weight, the resin composition proves too low in impact resistance to put to practical use.

Antimony trioxide used as a component (C) in the present invention is commercially available. The content of the component (C) in the flame-retardant resin composition of the present invention is usually 1 to 10 parts by weight, preferably 2 to 10 parts by weight based on 100 parts by weight of the styrene based polymer.

Antimony trioxide serves as a flame-retarding auxiliary for the halogen-containing flame-retardant. In the flame-retardant resin composition of the present invention, the content of antimony trioxide is preferably 1/5 to 1/2.5 of the total amount of the brominated bisphenol epoxy resin or a resin in which at least one of the epoxy terminals thereof is blocked with a brominated phenol as the component (B) and chlorinated polyethylene which is an optional component (E) described later.

As for the methacrylate polymer as a component (D) in the present invention, there can be used a homopolymer or a copolymer containing the methacrylate units derived from methacrylic acid or a lower alkyl methacrylate (carbon number of alkyl group: 1 to 5) in an amount of not less than 25 wt %, preferably not less than 40 wt %, more preferably 50 to 100 wt %.

As the methacrylate monomer constituting the methacrylate polymer as the component (D), methacrylic acid, lower alkyl methacrylates such as methyl methacrylate, ethyl methacrylate, butyl methacrylate, etc., and mixtures thereof can be used. As the monomer copolymerizable with the methacrylate monomer, the aromatic vinyl monomers such as styrene, α-methylstyrene, vinyltoluene, etc., and the cyano-substituted vinyl monomers such as acrylonitrile, methacrylonitrile, etc., can be used. The aromatic vinyl monomers such as styrene and its derivatives are especially preferred.

The content of the component (D) is usually 0.3 to 5 parts by weight, preferably 0.5 to 3 parts by weight based on 100 parts by weight of the styrene based polymer. When the content of the component (D) is less than 0.3 parts by weight based on 100 parts by weight of the styrene based polymer, the resin composition shows an adhesive tendency to the metal portions of the extruder, molding machine, etc., during working and molding operations. This gives rise to the problem of retainment (detention) of the resin composition in the extruder or molding machine, resulting in occurrence of such undesirable phenomena as decoloration and yellowing of the molded product. When the component (D) content exceeds 5 parts by weight, the molded product is reduced in strength.

For further elevating flame-retardant property of the flame-retardant resin composition comprising a styrene based polymer, a brominated bisphenol epoxy resin or a resin in which at least one of the epoxy terminals of the brominated bisphenol epoxy resin is blocked with a brominated phenol, antimony trioxide and a methacrylate polymer, it is recommended to add chlorinated polyethylene as a component (E) thereto.

Chlorinated polyethylene used as the component (E) in the present invention is commercially available. There is usually used a chlorinated polyethylene having a melt flow index (measured at 180° C. under a load of 100 kg with a nozzle diameter of 1 mm) of $1 \times 10^{-3}$ to $100 \times 10^{-3}$ cc/sec, preferably $10 \times 10^{-3}$ to $50 \times 10^{-3}$ cc/sec, and a chlorine content of 15 to 40 wt %, preferably 20 to 35 wt %.

In the present invention, the content of the component (E) is not more than 5 parts by weight based on 100 parts by weight of the styrene based polymer and when the component (E) is added to the resin composition, the content thereof is preferably 1 to 3 parts by weight based on 100 parts by weight of the styrene based polymer.

The flame-retardant resin composition according to the present invention may contain other additives, as occasion demand, within limits not prejudicial to the effect of the present invention. These additives include a thermal stabilizer, an antioxidant, a light stabilizer, a lubricant, a colorant, etc.

The flame-retardant resin composition of the present invention is produced by adding the specified components at one time or stepwise and mixing them at the softening or melting point of the components to obtain a homogeneous composition. Mixing can be accomplished by using a commonly employed mixing means such as heated rolls, Banbury mixer, extruder, etc.

The flame-retardant resin composition of the present invention is has advantages that deposition (adhesiveness) of the molten resin to the screw in working or molding operation is less than 5% of the total area of the screw. The flame-retardant resin composition of the present invention also has an excellent workability and is substantially proof against decoloration due to retainment.

The styrene based polymer composition containing methacrylate polymer with a methacrylate unit content of not less than 25 wt % according to the present invention is excellent in flame-retardant property, thermal stability and heat resistance, minimized in plate-out, low in depositing property, in a molten state, to metals and also excellent in workability and moldability. Thus, it is an industrially useful flame-retardant resin composition.

EXAMPLES

The present invention is explained in more detail in the following Examples, however, it should be recognized that the scope of the present invention is not restricted to these Examples.

In the following Examples, (1) degree of deposition of the resin on the screw, (2) decoloration of the deposited resin due to retainment, (3) releasability from a heated roll and (4) adhesive strength to hard chrome plated plate were evaluated by the following test methods.

(1) Degree of deposition on screw 60 kg of the resin composition of the present invention was injection molded into pellets under the conditions shown below. After molding has been completed, the screw of the molding machine was forcibly drawn out and the degree of deposition of the molten resin on the screw was visually observed. The criterion of evaluation is as set forth below. It is desirable that the rating is A to C.

Conditions

Molding machine: Vented-type, M150 A-II DV (mfd. by Meiki Corp.) General-type, 1S9OB (mfd. by Toshiba Machinery Co., Ltd.)

Cylinder temperature: 210-220-220-210-220° C. (vented-type) 210-220-220-210° C. (general-type)

Injection pressure (hydraulic): 90–70 kg/cm$^2$

Injection speed (gage): 50%

| Criterion: | |
| --- | --- |
| Resin deposited on check ring and head alone | A |
| Resin deposited on the portion forward of the kneading section (deposited on less than 10% of the whole area of the screw) | B |
| Resin deposited on the portion forward of the compressing section (i) (deposited on not less than 10% and less than 20% of the whole area of the screw) | C |
| Resin deposited on the portion forward of the compressing section (ii) (deposited on not less than 20% and less than 30% of the whole area of the screw) | D |
| Resin deposited generally (deposited on not less than 30% of the whole area of the screw) | E |

(2) Decoloration of deposited resin due to retainment

On completion of injection molding conducted under the conditions shown in the item (1), the screw of the molding machine was forcibly drawn out and the degree of decoloration of the resin deposited on the screw was visually observed. The criterion of evaluation is as shown below. It is desirable that the rating is A.

| Criterion: | |
| --- | --- |
| Substantially no decoloration has occurred | A |
| Decoloration has occurred slightly | B |
| Decoloration has occurred heavily | C |

(3) Amount of AS resin required for removing residual resin

The screw which had been drawn out for examining the degree of deposition of the molten resin was remounted in the molding machine, and injection molding was carried out under the same conditions as described above by using AS resin (a resin obtained by synthesizing from 30 wt % of acrylonitrile and 70 wt % of styrene). After this injection molding, the interior of the molding machine was washed and the amount of AS resin required for perfectly eliminating ABS resin from the molding machine was measured.

It is desirable that the amount of AS resin required for the said purpose is less than 3.5 kg.

(4) Releasability from heated roll

Pellets composed of the resin composition were mixed and kneaded by a small-sized Banbury mixer (mixer damping temperature: 200° C.) and shaped into a plate by a heated roll (surface temperature: 150° C.), and releasability of the composition from the heated roll after the above operation was examined. The criterion of evaluation is as shown below. It is desirable that the rating is A or B.

| Criterion: | |
|---|---|
| The composition separated from the roll by itself with its own weight | A |
| The composition separated smoothly when pulled | B |
| The composition stuck to the roll and wouldn't separate even when pulled | C |

(5) Adhesive strength to hard chrome plated plate

Pellets composed of the resin composition were molded into a 4 mm×10 mm×20 mm test piece, and this test piece was placed on a hard chrome plated plate, left in a temperature of 220° C. for 30 minutes, and after cooling, pushed from a side by a steelyard, and the load under which the test piece was forced to separate from the hard chrome plated plate was measured in order to judge the separation easiness of the resin composition from the metal surface. It is desirable that the adhesive strength to the hard chrome plated plate is not more than 1000 g.

EXAMPLES 1 and 2

To 100 parts by weight of an ABS resin (a resin obtained by synthesizing 25 wt % of acrylonitrile, 16 wt % of butadiene and 59 wt % of styrene) (TAFREX-610, produced by Monsanto Kasei Company) used as a component (A), there were added 28 parts by weight of a brominated bisphenol A epoxy resin (epoxy equivalent: 650 g/eq; bromine content: 50.8 wt %; number average molecular weight: 1,300) (YDB 406, produced by Toto Kasei K. K.) as a component (B), 5.4 parts by weight of antimony trioxide (ULTRA-FINE II, produced by Laurel Industry Co., Ltd.) as a component (C), and a methacrylate polymer (a polymer obtained by synthesizing 40 wt % of methyl methacrylate, 20 wt % of n-butyl acrylate, 30 wt % of styrene and 10 wt % of other monomers) (METABLEN P700, produced by Mitsubishi Rayon Co., Ltd.) as a component (D). Further added thereto were 1.4 parts by weight of magnesium stearate as a dispersion auxiliary agent, 0.3 parts by weight of aluminum molybdenate as a thermal stabilizer, 0.3 parts by weight of a hindered phenol as an antioxidant and 2.0 parts by weight of a colorant. The resulting mixture was kneaded by a Banbury mixer and a roll mill and then pelletized to obtain the pellets of the flame-retardant resin composition according to the present invention. The pellets were molded by a vented injection molding machine, and the degree of deposition of the molten resin on the screw, decoloration of the deposited resin due to retainment and the amount of AS resin required for removing the residual resin were examined. The results are shown in Table 1.

The molded products obtained from the resin compositions of Example 1 showed an Izod impact strength (JIS K-7110) of 12 kg-cm/cm, a tensile strength (JIS K-7113) of 400 kg/cm², flammability (UL-94) of V-O (thickness: 1/12 inch) and a heat deformation temperature (JIS K-7207) of 80° C.

Izod impact strength, tensile strength, flammability and heat deformation temperature of the molded product of Example 2 were substantially the same as those of the molded product of Example 1.

EXAMPLE 3

Pellet of a flame-retardant resin composition were obtained in the same procedure as Example 1 except that 1 part by weight of behenic acid was added. The degree of deposition of the molten resin on the screw, decoloration of the deposited resin and the amount of AS resin required for removing the residual resin were examined in the same ways as Example 1 except for use of a non-vented injection molding machine. The results are shown in Table 1.

Izod impact strength, tensile strength, flammability and heat deformation temperature of the molded product, determined in the ways as Example 1, were substantially the same as those of the molded product of Example 1.

Comparative Example 1

Pellets were made by following the same procedure as Example 1 except that no methacrylate polymer was added as a component (D), and these pellets were molded and subjected to the tests as in Example 1. The results are shown in Table 1.

Comparative Example 2

The same procedure as Example 1 was carried out except that no methacrylate polymer was added as a component (D) and that a non-vented injection molding machine was used. The test results are shown in Table 1.

Comparative Examples 3 and 4

The same procedure as Example 1 was repeated except that silicone oil (viscosity at 25° C.: 10,000 cst) (Comp. Example 3) or an ester wax (melting point: 126° C) (Comp. Example 4) was used in place of the methacrylate polymer used as a component (D). The test results are shown in Table 1.

The composition obtained in Comparative Example 4 was very low in flame retardant property.

TABLE 1

| Component (parts by weight) | Example 1 | Example 2 | Example 3 |
|---|---|---|---|
| A | 100 | 100 | 100 |
| B | 28 | 28 | 28 |
| C | 5.4 | 5.4 | 5.4 |
| D | 1.0 | 0.7 | 1.0 |
| E | — | — | — |
| Behenic acid | — | — | 1.0 |
| Other adjuvants | 4.0 | 4.0 | 4.0 |
| Silicone oil or ester wax | — | — | — |
| Degree of deposition on screw | B | B | A |
| Decoloration of deposited resin due to retainment | A | A | A |
| Amount of AS resin required for removing residual resin (kg) | 3 | 3 | 1 |

| Component (parts by weight | Comp. Example 1 | Comp. Example 2 | Comp. Example 3 | Comp. Example 4 |
|---|---|---|---|---|
| A | 100 | 100 | 100 | 100 |
| B | 28 | 28 | 28 | 28 |
| C | 5.4 | 5.4 | 5.4 | 5.4 |
| D | — | — | — | — |
| E | — | — | — | — |
| Behenic acid | — | — | — | — |
| Other adjuvants | 4.0 | 4.0 | 4.0 | 4.0 |
| Silicone oil or ester wax | — | — | 0.3 | 4.0 |
| Degree of deposition | E | E | E | D |

TABLE 1-continued

| on screw | | | | |
|---|---|---|---|---|
| Decoloration of deposited resin due to retainment | C | A | C | C |
| Amount of AS resin required for removing residual resin (kg) | 7 | 3 | 6 | 6 |

TABLE 2

| Component (parts by weight) | Example 4 | Comp. Example 5 | Comp. Example 6 |
|---|---|---|---|
| A | 100 | 100 | 100 |
| B | 28 | 28 | 28 |
| C | 5.4 | 5.4 | 5.4 |
| D | 1.0 | — | — |
| E | 1.0 | 1.0 | 1.0 |
| Behenic acid | — | — | 1.0 |
| Other adjuvants | 4.0 | 4.0 | 4.0 |
| Degree of deposition on screw | B | D | D |
| Decoloration of deposited resin | B | C | C |
| Amount of AS resin required for removing residual resin (kg) | 3 | 5 | 5 |

EXAMPLE 4

To 100 parts by weight of an ABS resin (a resin obtained by synthesizing from 25 wt % of acrylonitrile, 16 wt % of butadiene and 59 wt % of styrene) (TAFREX-610, produced by Monsanto Kasei Company) used as a component (A), there were added 28 parts by weight of a brominated bisphenol A epoxy resin (epoxy equivalent: 650 g/eq; bromine content: 50.8 wt %; number average molecular weight: 1,300) (YDB 406, produced by Toro Kasei Kabushiki Kaisha) as component B, 5.4 parts by weight of antimony trioxide (ULTRA-FINE, produced by Laurel Industry Co., Ltd.) as a component (C), 1 part by weight of a methacrylate polymer (a polymer obtained by synthesizing 40 wt % of methyl methacrylate, 20 wt % of n-butyl acrylate, 30 wt % of styrene and 10 wt % of other monomers) (ME-TABLEN P700, produced by Mitsubishi Rayon Co., Ltd.) as a component (D) and 1 part by weight of a chlorinated polyethylene (flow rate (measured at 180° C. under a load of 100 kg with a nozzle diameter of 1 mm and a nozzle length of 10 mm): $40 \times 10^{-3}$ cc/sec; chlorine content: about 30 wt %) (J230, produced by Daiso Co., Ltd.) as component (E). There were further added 1.4 parts by weight of magnesium stearate as a dispersion auxiliary agent, 0.3 parts by weight of aluminum molybdenate as a thermal stabilizer, 0.3 parts by weight of a hindered phenol as an antioxidant and 2.0 parts by weight of a colorant such as titanium oxide. The resultant mixture was kneaded by a Banbury mixer and a roll mill and then pelletized to obtain the pellets of the resin composition of the present invention.

The pellets were molded by a vented injection molding machine, and the degree of deposition of the molten resin on the screw, decoloration of the deposited resin due to retainment and the amount of AS resin required for removing the residual resin were determined. The results are shown in Table 2.

Izod impact strength, tensile strength, flammability and heat deformation temperature of the molded product were substantially equal to those of the molded product of Example 1.

Comparative Example 5

The same procedure as Example 4 was carried out except that no methacrylate polymer was added as a component (D). The results are shown in Table 2.

Comparative Example 6

The same procedure as Example 4 was carried out except that 0.3 parts by weight of behenic acid was added in place of the methacrylate polymer as a component (D). The results are shown in Table 2.

EXAMPLE 6

To 100 parts by weight of an ABS resin (a resin synthesized from 25 wt % of acrylonitrile, 16 wt % of butadiene and 59 wt % of styrene) (TAFREX-610, produced by Monsanto Kasei Company) used as a component (A), there were added 26 parts by weight of a brominated bisphenol A epoxy resin in which both ends of the epoxy group thereof are blocked with a brominated phenol (epoxy equivalent: g/eq; bromine content: 58 wt %; number average molecular weight: 1,100) (BR 340, produced by Hitachi Chemical Industries Co., Ltd.) as a component (B), 5.4 parts by weight of antimony trioxide (ULTRA-FINE, PRODUCED BY Laurel Industry Co., Ltd.) as a component (C) and 1 part by weight of a methacrylate polymer (a polymer obtained by synthesizing 40 wt % of methyl methacrylate, 20 wt % of n-butyl acrylate, 30 wt % of styrene and 10 wt % of other monomers) (METABLEN P700, produced by Mitsubishi Rayon Co., Ltd.) as a component (D). Further added thereto were 1.4 parts by weight of magnesium stearate as a dispersion auxiliary agent, 0.3 parts by weight of aluminum molybdenate as a thermal stabilizer, 0.3 parts by weight of a hindered phenol as an antioxidant and 2.0 parts by weight of a colorant such as titanium oxide. The resultant mixture was kneaded by a Banbury mixer and a roll mill and then pelletized to obtain the pellets of the resin composition of the present invention.

The pellets were molded by a vented injection molding machine, and the degree of deposition of the molten resin on the screw, decoloration of the deposited resin due to retainment and the amount of AS resin required for removing the residual resin were determined. The results are shown in Table 3.

Izod impact strength, tensile strength, flammability and heat deformation temperature of the molded product were substantially the same as those of the molded product of Example 1.

EXAMPLE 6

The same procedure as Example 5 was repeated except that one part by weight of a chlorinated polyethylene (flow rate (measured at 180° C. under a load of 100 kg with a nozzle diameter of 1 mm and a nozzle length of 10 mm): $40 \times 10^{-3}$ cc/sec; chlorine content: about 30 wt %) (J-230, produced by Daiso Co., Ltd.) was added as a component (E). The results are shown in Table 3.

Comparative Example 7

The same procedure as Example 5 was carried out except that no methacrylate polymer was added as a component (D). The results are shown in Table 3.

TABLE 3

| Component (parts by weight) | Example 5 | Example 6 | Comp. Example 7 |
|---|---|---|---|
| A | 100 | 100 | 100 |
| B | 26 | 26 | 26 |
| C | 5.4 | 5.4 | 5.4 |
| D | 1.0 | 1.0 | — |
| E | — | 1.0 | — |
| Other adjuvants | 4.0 | 4.0 | 4.0 |
| Degree of deposition on screw | A | A | D |
| Decoloration of deposited resin | A | B | C |
| Amount of AS resin required for removing residual resin (kg) | 1 | 1 | 4 |

EXAMPLES 7-10

To 100 parts by weight of an ABS resin (a resin obtained by synthesizing 25 wt % of acrylonitrile, 16 wt % of butadiene and 59 wt % of styrene) (TAFREX 610, produced by Monsanto Kasei Company) used as a component (A), there were added 28 parts by weight of a brominated bisphenol A epoxy resin (epoxy equivalent: 650 g/eq; bromine content: 50.8 wt %; number average molecular weight: 1,300) (YDB 406, produced by Toto Kasei K. K.) as a component (B), 5.4 parts by weight of antimony trioxide (ULTRA-FINE, produced by Laurel Industry Co., Ltd.) as a component (C) and a methacrylate polymer (a polymer obtained by synthesizing 40 wt % of methyl methacrylate, 20 wt % of n-butyl acrylate, 30 wt % of styrene and 10 wt % of other monomers) (METABLEN P700, produced by Mitsubishi Rayon Co., Ltd.) as a component (D) in an amount shown in Table 4 to obtain a flame-retardant resin composition.

This resin composition was kneaded by a small-sized Banbury mixer, and releasability of the composition from a heated roll when the composition was molded into a plate by the heated roll and adhesive strength of a 4 mm×10 mm×20 mm test piece of the molding to a hard chrome plated plate were determined. The results are shown in Table 4.

EXAMPLE 11

The same procedure as Example 10 was carried out except that 0.5 parts by weight of a chlorinated polyethylene (flow rate (measured at 180° C. under a load of 100 kg with a nozzle diameter of 1 mm and a nozzle length of 10 mm): $40 \times 10^{-3}$ cc/sec; chlorine content: about 30 wt %) (J-230, produced by Daiso Co., Ltd.) was added as a component (E). The results are shown in Table 4.

Comparative Example 8

By using the resin composition of Comparative Example 1, releasability from a heated roll when the composition was molded into a plate by the heated roll and adhesive strength of a 4 mm×10 mm×20 mm test piece to a hard chrome plated plate were determined. The results are shown in Table 4.

Comparative Example 9

The same procedure as Example 7 was repeated except that no methacrylate polymer was added as a component (D). The results are shown in Table 4.

TABLE 4

| Component (parts by weight) | Example 7 | Example 8 | Example 9 |
|---|---|---|---|
| A | 100 | 100 | 100 |
| B | 28 | 28 | 28 |
| C | 5.4 | 5.4 | 5.4 |
| D | 0.3 | 0.5 | 0.7 |
| E | — | — | — |
| Releasability from heated roll | B | A | A |
| Adhesive strength to hard chrome plated (g) | 1,000 | 900 | 600 |

| Component (parts by weight) | Example 10 | Example 11 | Comp. Example 8 | Comp. Example 9 |
|---|---|---|---|---|
| A | 100 | 100 | 100 | 100 |
| B | 28 | 28 | 28 | 28 |
| C | 5.4 | 5.4 | 5.4 | 5.4 |
| D | 1.0 | 0.7 | — | — |
| E | — | 0.5 | — | 1.0 |
| Releasability from heated roll | A | A | C | C |
| Adhesive strength to hard chrome plated (g) | 600 | 530 | 800 | >5000 |

What is claimed is:

1. A flame-retardant resin composition comprising 100 parts by weight of a styrene based polymer, 10 to 40 parts by weight of a brominated bisphenol epoxy resin or a resin in which at least one of the epoxy terminals of the brominated bisphenol epoxy resin is blocked with a brominated phenol, 1 to 10 parts by weight of antimony trioxide, and 0.3 to 5 parts by weight of a methacrylate polymer with a methacrylate unit content of not less than 25 wt %.

2. A flame-retardant resin composition according to claim 1 further containing not more than 5 parts by weight of a chlorinated polyethylene.

3. A flame-retardant resin composition according to claim 1, wherein the methacrylate polymer has the methacrylate units derived from at least one methacrylic acid based monomer selected from methacrylic acid and lower alkyl methacrylates.

4. A flame-retardant resin composition according to claim 3, wherein the methacrylic acid based monomer is lower alkyl methacrylates.

5. A flame-retardant resin composition according to claim 1, wherein the methacrylate polymer is a polymer obtained by polymerizing a monomeric mixture of 50 to 80 wt % of at least one methacrylic acid based monomer selected from the group consisting of methacrylic acid and lower alkyl methacrylates, 20 to 50 wt % of a vinyl monomer selected from the group consisting of aromatic vinyl monomers and cyanided vinyl monomers, and optionally not more than 20 wt % of a monomer copolymerizable with said monomers.

6. A flame-retardant resin composition according to claim 4, wherein the aromatic vinyl monomer is styrene.

7. A flame-retardant resin composition according to claim 1, wherein the styrene based polymer is at least one resin selected from the group consisting of ABS resin, AES resin, AAS resin and HIPS resin, with the content of rubber moiety of 5 to 50 wt %.

8. A flame-retardant resin composition according to claim 5, wherein the styrene based polymer is ABS resin.

9. A flame-retardant resin composition according to claim 1, wherein the brominated bisphenol epoxy resin is a resin obtained from a condensation reaction of a brominated bisphenol and epihalohydrin, and having an epoxy group at both molecular ends thereof.

10. A flame-retardant resin composition according to claim 1, wherein the epoxy equivalent of the brominated bisphenol epoxy resin or the resin in which at least one of the epoxy terminals thereof is blocked with a brominated phenol is 300 to 70,000 g/eq.

11. A flame-retardant resin composition according to claim 1, wherein the bromine content of the brominated bisphenol epoxy resin or the resin in which at least one of the epoxy terminals thereof is blocked with a brominated phenol is 30 to 60 wt %.

12. A flame-retardant resin composition according to claim 2, wherein the melt flow rate of the chlorinated polyethylene (measured at 180° C. under a load of 100 kg with a nozzle diameter of 1 mm) is $1 \times 10^{-3}$ to $100 \times 10^{-3}$ cc/sec, and the chlorine content is 15 to 40 wt %.

13. A flame-retardant resin composition according to claim 1, wherein the methacrylate unit content is not less than 40 wt %.

14. A flame-retardant resin composition according to claim 10, wherein the methacrylate unit content is 50 to 100 wt %.

15. A flame-retardant resin composition according to claim 1, wherein the content of the methacrylate polymer is 0.5 to 3 parts by weight based on 100 parts by weight of the styrene based polymer.

16. A flame-retardant resin composition according to claim 1, wherein the polymerization degree of the brominated bisphenol epoxy resin is 2 to 10.

17. A flame-retardant resin composition according to claim 1, wherein the brominated bisphenol epoxy resin is a brominated bisphenol A epoxy resin.

18. A flame-retardant resin composition according to claim 1, wherein the content of the brominated bisphenol epoxy resin or the resin in which at least one of the epoxy terminals thereof is blocked with a brominated phenol, is 15 to 35 parts by weight based on 100 parts by weight of the styrene based polymer.

* * * * *